United States Patent
Morris et al.

(10) Patent No.: US 6,336,133 B1
(45) Date of Patent: Jan. 1, 2002

(54) REGULATING USERS OF ONLINE FORUMS

(75) Inventors: Harry W. Morris, Reston; Eric Bosco, Arlington; David Lowell Lippke, Herndon; Colin Anthony Steele, Leesburg, all of VA (US)

(73) Assignee: America Online, Inc., Dulles, VA (US)

( * ) Notice: Subject to any disclaimer, the term of this patent is extended or adjusted under 35 U.S.C. 154(b) by 0 days.

(21) Appl. No.: 09/076,483

(22) Filed: May 13, 1998

Related U.S. Application Data

(60) Provisional application No. 60/047,235, filed on May 20, 1997.

(51) Int. Cl.$^7$ .............................................. G06F 13/00
(52) U.S. Cl. ...................... 709/204; 709/225; 709/218; 345/330
(58) Field of Search ................................. 709/204, 217, 709/218, 219, 225; 345/330

(56) References Cited

U.S. PATENT DOCUMENTS

| | | | |
|---|---|---|---|
| 4,707,832 A | * 11/1987 | Glenn et al. ................. | 370/489 |
| 5,265,221 A | 11/1993 | Miller .......................... | 711/163 |
| 5,363,507 A | * 11/1994 | Nakayama et al. .......... | 345/331 |
| 5,423,038 A | * 6/1995 | Davis .......................... | 709/303 |
| 5,701,340 A | * 12/1997 | Zwick .......................... | 379/204 |
| 5,825,750 A | * 10/1998 | Thompson ................... | 370/244 |
| 5,941,947 A | * 8/1999 | Brown et al. ................ | 709/225 |
| 6,029,043 A | * 2/2000 | Ho et al. ..................... | 434/350 |
| 6,052,723 A | * 4/2000 | Ginn ............................ | 709/223 |
| 6,076,100 A | * 6/2000 | Cottrille et al. ............. | 709/203 |

OTHER PUBLICATIONS

LambdaMOO Help Database; ftp://ftp.lambda.moo.mud.org/pub/MOO/HelpSystem–02Jun93.txt.*

J. Berkman, "Nonviolent Crowd Control", Proceedings of the ACM SIGUCCS 1993 User Services Conference XXI, Nov. 7–10, 1993, San Diego, CA, U.S., pp. 173–178.

J. Johnson–Eiolola et al., "Policing Ourselves: Defining the Boundaries of Appropriate Discussion in Online Forums", Computers and Composition, vol. 13, No. 3, 1996, U.S., pp. 269–291.

Lichty, Tom, The Official America Online For Windows 95 Tour Guide, 1996, U.S.A., "The Guide Pager"pp. 238–239.

Rheingold, Howard, The Virtual Community (Homesteading on the Electronic Frontier), http:/www.rheingold.com/v.book, 24 pages, (1998).

Farmer, F. Randall, Habitat Anecdotes, Fall 1988, http://sunsite.unc.edu/pub/academic/communications/papers/habitat/anecdotes.rtf, 13 pages.

Morningstar, Chip et al., The Lessons of Lucasfilm's Habitat, http://www.communities.com/company/papers/lessons.html, Sep. 1, 1998, 15 pages, (1990).

* cited by examiner

*Primary Examiner*—Kenneth R. Coulter
(74) *Attorney, Agent, or Firm*—Fish & Richardson P.C.

(57) ABSTRACT

Regulating a user of a computer-based service includes receiving input about a first user from at least one other user of the computer-based service, determining a degree to which the at least one other user can influence a parameter associated with the first user, and modifying the first user's parameter based on the received input and the determined degree of influence. The first user's parameter, for example, can relate to the first user's ability to use the computer-based service.

92 Claims, 5 Drawing Sheets

REGULATING USERS OF ONLINE FORUMS

This application is a continuation of provisional application No. 60/047,235 filed May 20, 1997, which is incorporated herein by reference.

BACKGROUND

1. Technical Field

This invention relates to distributed computer services, particularly computer services having online forums.

2. Background Information

An online forum is a communications interchange in which people may communicate with others through successive electronic transmissions between respective computer systems. An online forum, or any other type of distributed computer services, may be implemented on a distributed computer system such as that shown in FIG. 1. Forum participants (equivalently, users of the computer services) typically are scattered across a large geographical area and communicate with one or more central server systems 100 through respective client systems 102 (e.g., a personal or laptop computer). In practice, the server system 100 typically will not be a single monolithic entity but rather will be a network of interconnected server computers, possibly physically dispersed from each other, each dedicated to its own set of duties and/or to a particular geographical region. In such a case, the individual servers are interconnected by a network of communication links, in known fashion. One such server system is "America Online" from America Online Incorporated of Virginia.

Each client system 102 runs client software that allows it to communicate in a meaningful manner with corresponding software running on the server system 100. The client systems 102 communicate with the server system 100 through various channels, such as a modem 104 connected to a telephone line 106 or a direct Internet connection using a transfer protocol such as TCP/IP (Transfer Control Protocol/Internet Protocol). The server system 100 is responsible for receiving input from the client systems 102, manipulating the collective body of input information (and possibly information from other sources) into a useful format, and retransmitting the formatted information back to one or more clients 102 for output on an output device, such as a display screen.

Referring to FIG. 2, one type of forum is a "chat room" 200, in which the various participants 204 (e.g., "Allens9," "JOSHUAALEX," etc.) may enter text which appears in a scrolling text window 202 on each participant's computer display screen. In the example in FIG. 2, the chat room 200 has 22 participants whose identities (or "screen names") are listed in a scrolling window 210. A participant 204 may respond to the comment of another participant 204 by entering a line of text in an edit box 206 and activating (e.g., by clicking with a pointer device, such as a mouse) a SEND button 208. In response, the text in the scrolling text window 202 scrolls upwards and the newly entered line of text is displayed at the bottom of the scrolling text window 202. In the illustrated example, the last participant to enter a comment was JOSHUAALEX, who typed "TEXAS."

The chat room 200 shown in FIG. 2 is "public", meaning that it has multiple participants who were placed in the chat room by the computer-service provider and who most likely never have met or conversed with one another before. A comment by a participant in a public forum may be seen by all of the participants of the chat room. If a participant desires some privacy, that participant may "open" and enter a "private" chat room (for example, by clicking on a SETUP button 212), and thereafter invite one or more other participants to enter the private chat room. Once in a private forum, participants may communicate with one another without fear that uninvited participants will be able to see their comments.

When a participant in a forum, whether public or private, makes a comment that others in the forum regard as offensive, in poor taste, wildly incorrect, or otherwise objectionable, the offending participant most likely will be "flamed" by one or more of the other participants. A "flame" is a reprimand or other stringent response directed at the offending party. One purpose behind flaming another participant is to dissuade the offender, through embarrassment or intimidation, from making further objectionable comments. In this manner, if the offending user chooses to curb his or her behavior in response to the flaming, a forum may be crudely regulated or "policed" by the forum's participants. However, the offending participant may continue to behave in an objectionable manner. Further, a participant who overly "flames" other participants may also be objectionable. Accordingly, participant policing of forums does not always work well. In such cases, offended participants may drop out of "flame-filled" forums, and/or the online service must devote resources to actively police problematic participants.

Other objectionable behavior includes sending one or more messages to "spoof" other users as to the sender's identity in order to try to get confidential information (e.g., credit card numbers or passwords) sent in response (sometimes called "password fishing").

Another problem that can arise in online systems is "resource hogging", where a participant uses features such as broadcast or multi-cast messaging to send a large number of messages to other users in a short period of time (sometimes called "spamming"). Such resource hogging deprives other users of server resources, and can slow an online system response time to undesirable levels.

Accordingly, the inventor has determined that there is a need for a better way to police recalcitrant participants in online forums and to reduce spamming. The present invention provides a method and means for accomplishing this goal.

SUMMARY

Various embodiments of the invention can include one or more of the following features.

Regulating a user of a computer-based service may include receiving input about a first user from at least one other user of the computer-based service, determining a degree to which the other user can influence a parameter associated with the first user, and modifying the first user's parameter based on the received input and the determined degree of influence. The first user's parameter, for example, can relate to the first user's ability to use the computer-based service. The first user's parameter may remain unaffected when the degree of influence is determined to be zero.

The determination of the degree of influence may include considering a type of action engaged in by the first user that caused the other user to provide input. The other user can have a high degree of influence on the first user's parameter when the type of action engaged in by the first user that caused the other user to provide input was personally directed at the other user. For example, the other user may have a high degree of influence on the first user's parameter when the type of action engaged in by the first user was sending an Instant Message.

The determination of the degree of influence may include considering one or more factors relating to the first user or the other user or both. These factors can include a user's behavioral index, rate limiting state, resource (e.g., memory, number of forums occupied) usage, past complaints, illegal (e.g., hacker) activity, amount of revenue (e.g., subscription, advertising, e-commerce) generated, and messaging patterns. The basis of comparison can be to a predetermined threshold, a dynamically shifting threshold, the other user's corresponding level, or any combination thereof.

The determination of the degree of influence may include capping the degree of influence to a maximum amount, for example, either quantitatively (e.g., by applying a ceiling function) or temporally (e.g., by applying a time-out function). If a time-out function is applied, capping of the degree of influence may include applying a function based on an elapsed time since an occurrence of an action engaged in by the first user that caused the other user to provide input.

The determination of the degree of influence can include considering an interpersonal context between the first user and the other user, for example, by applying a function based on an ordering of events during an interaction of the first user and the other user.

Modification of the parameter associated with the first user may include limiting the first user's permissible messaging rates, limiting the first user's access to one or more forums, modifying the first user's cost of using the computer-based service, and varying a degree of influence (e.g., "evilability") that the first user has over another user of the computer-based service.

Modification of the parameter associated with the first user may include temporarily limiting the first user's ability to use the computer-based service if the input received from the other user constitutes a first occurrence of input about the first user. The temporary limitation on the first user's ability to use the computer-based service can constitute a short-term limitation.

Regulating a user of a computer-based service also may include displaying information related to a current state of the first user's modified parameter, for example, by updating a state of a graphical abstraction such as a power bar.

Advantages of this invention may include one or more of the following. The techniques described here enable a multiple-user online service (e.g., a chat room or other forum) to be self-policing. Users of a computer-based system have the ability to sanction a misbehaving user and thereby have the offending user sanctioned as appropriate, for example, by having the user's access to the system denied or curtailed. Unlike the conventional "flaming" approach to policing, which typically fails because it relies on the misbehaving user curbing his or her own behavior or results in retaliatory "flaming," the regulating techniques described here are based on predetermined rules and operate automatically in response to votes cast by other users of the computer system. The offending user has no choice in the matter once he or she chooses to misbehave. Because the operation of these regulating techniques is automatic, the computer-based service provider need not expend personnel time and resources to police public forums, direct user communications, and the like.

The privileges accorded to a misbehaving user can be regulated based on a modifiable set of rules in response to input about that user received from other users. The particular set of rules applied can be modified as appropriate according to the preferences of the system administrator. For example, user parameters relating to access to online forums, the cost of using the computer-based service, permissible messaging rates, the degree of influence that the user can exert over other users, and the like all can be adjusted based on other users' feedback to implement the desired system usage policies. The sanctions applied to a misbehaving user can be finely tuned to take into account the nature and timing of the objectionable conduct and the context under which it occurred, thereby giving system administrators a powerful and sophisticated tool for regulating user behavior. Despite the sophistication of these regulating techniques, users can be educated as to their operation through the display of graphic instrumentation. This instrumentation gives a user an intuitive indication of how his or her behavior, as well as the behavior of others, affects, and is affected by, application of the rules.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference numbers and designations in the various drawings indicate like elements.

DETAILED DESCRIPTION

The prospect of millions of concurrent users of an online computer system puts great pressure on the ability of the system provider to police abusive participants. Accordingly, the invention provides a self-policing online environment that makes participants responsible for their behavior. That is, other participants can express an opinion about that behavior, and have that opinion affect the offending user in a negative way and be "visible" to other participants. Providing such a self-policing user feedback mechanism lowers the cost of providing online services to users and provides a more "user-friendly" environment for participants.

In another aspect of the invention, the online computer system automatically tracks the rate at which a user sends certain types of messages, and can "rate limit" a user who "hogs" too many system resources by sending a large number of messages (or messages of selected types) in rapid succession.

Participant Self-Policing

Figure 1:
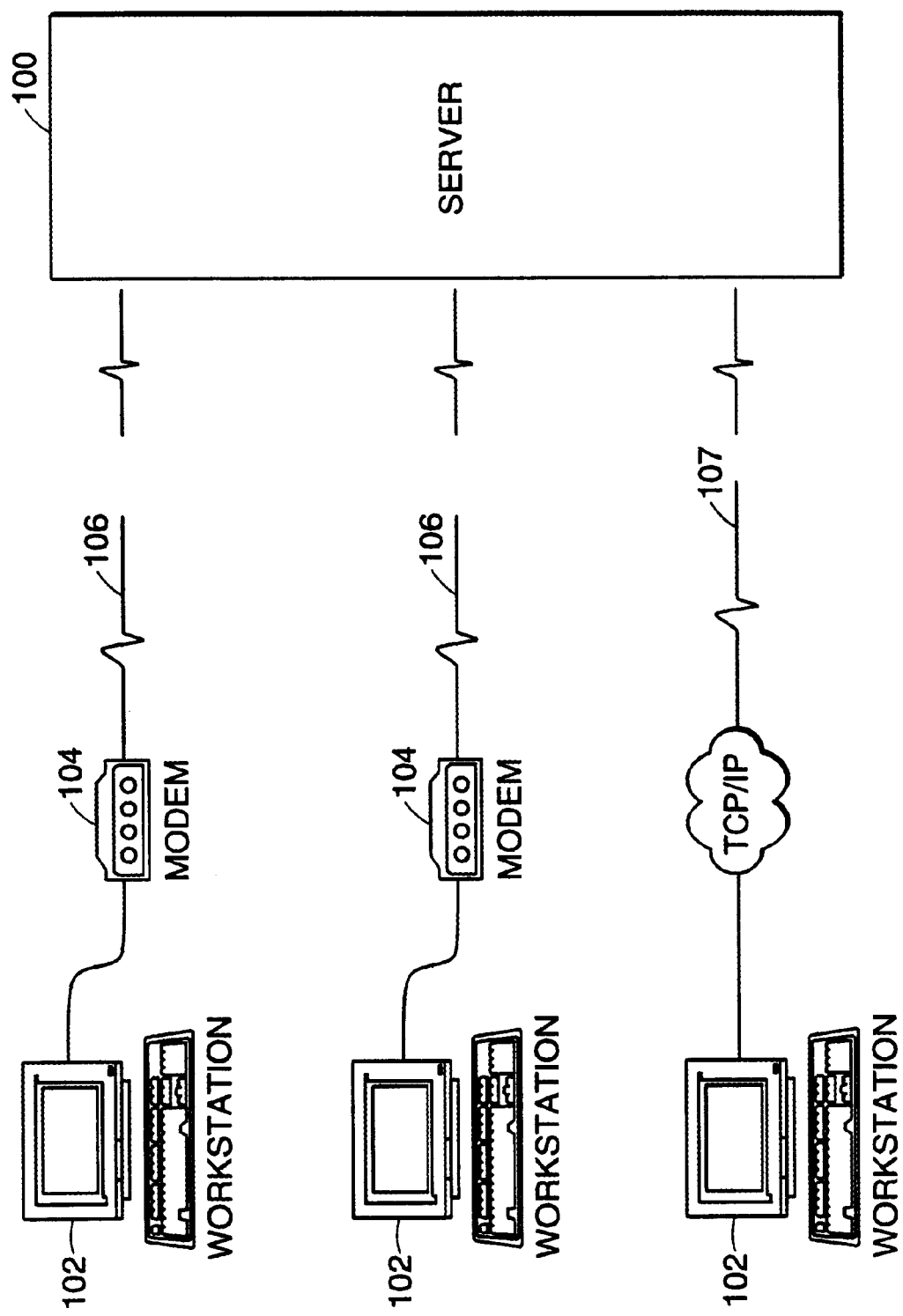
FIG. 1 shows a prior art distributed computer system of the type used for providing online computer services.
Figure 2:
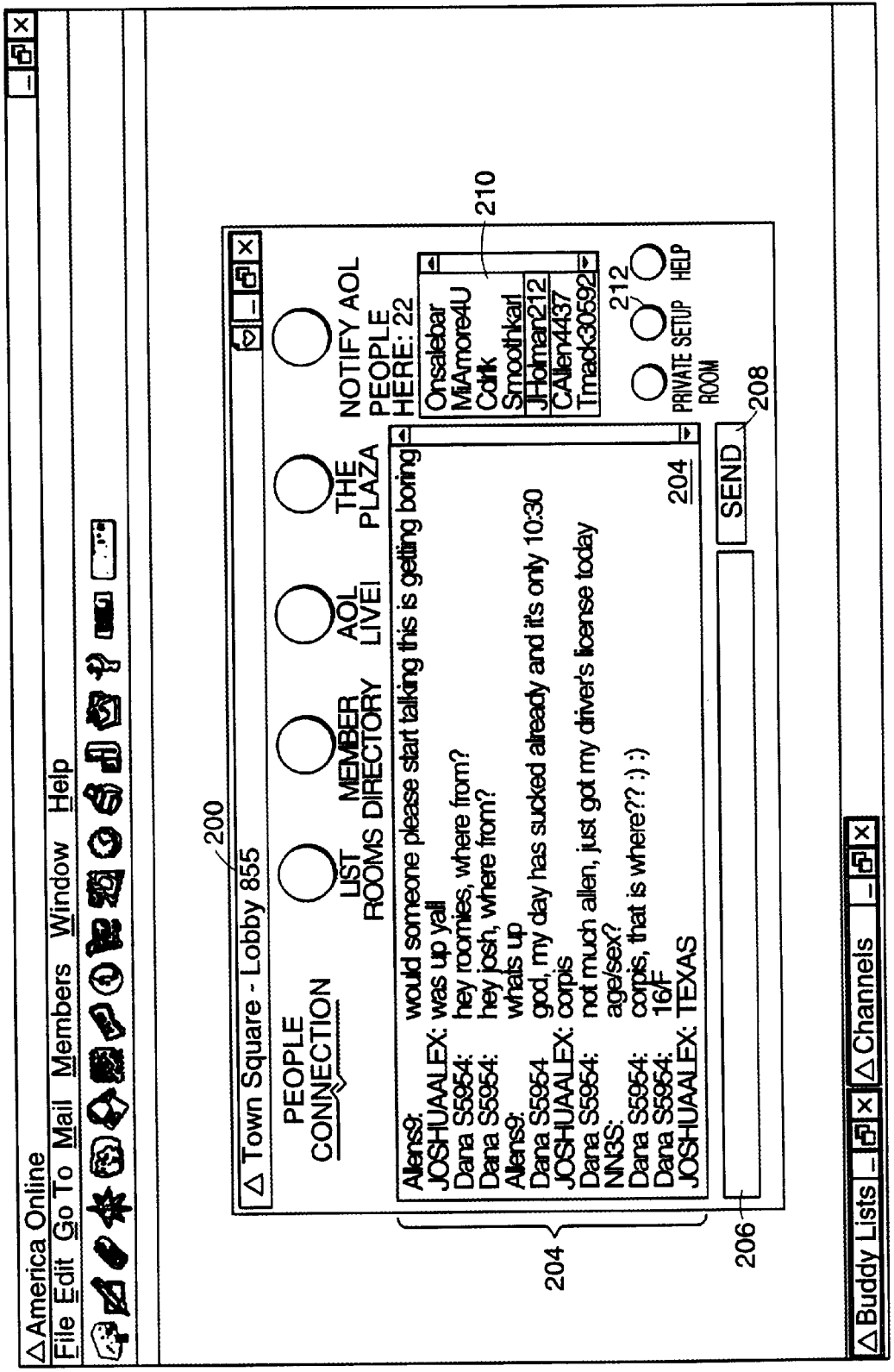
FIG. 2 is a screen shot showing an example of a prior art online computer forum.
Figure 3:
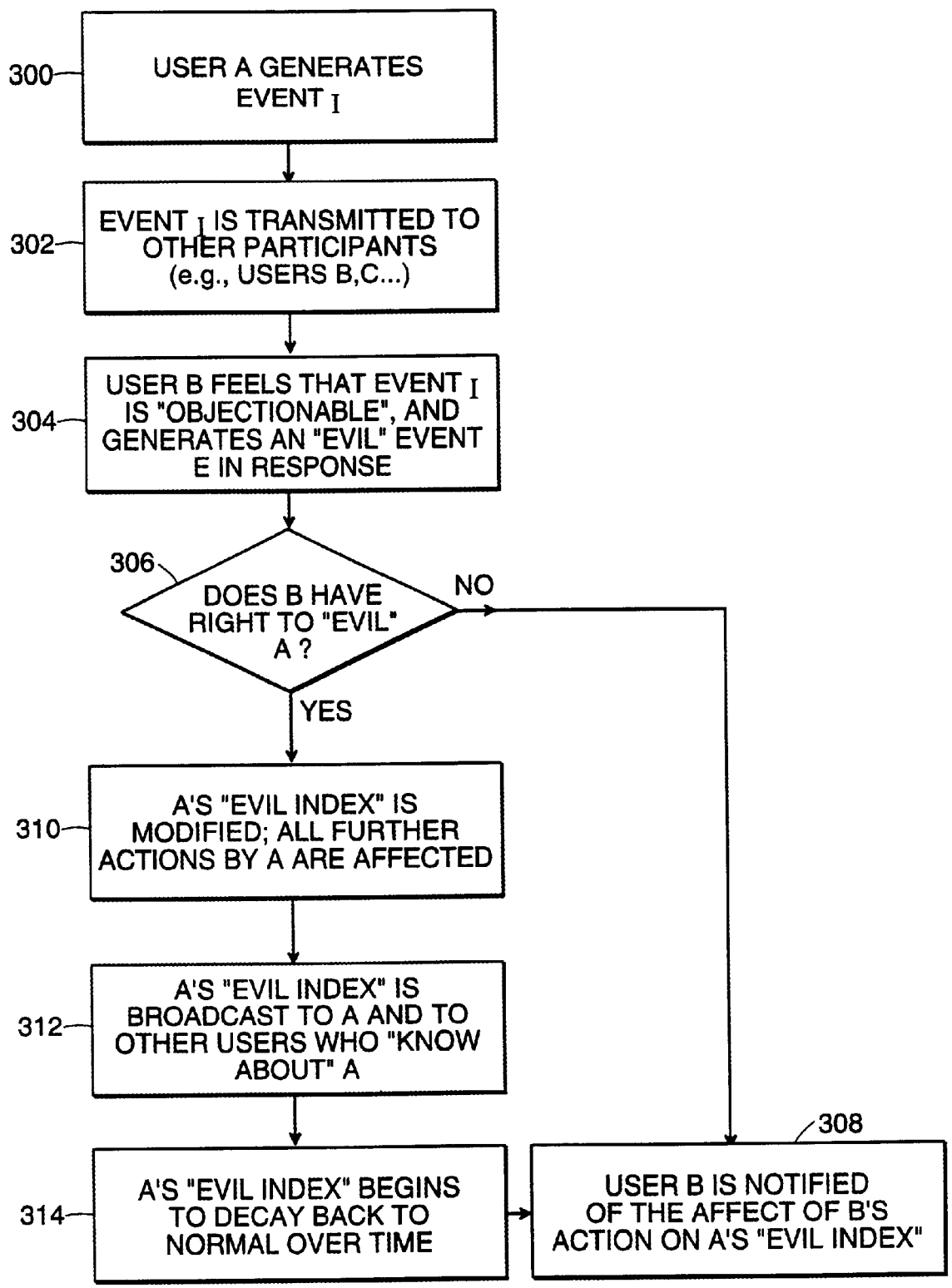
FIG. 3 is a flowchart of a basic embodiment of the self-policing aspect of the invention.

FIG. 3 is a flowchart of a basic embodiment of the self-policing aspect of the invention. Initially, user A generates an event I, such as a message (STEP 300). Event I is transmitted to some number of other participants, such as users B and C in a public forum on an online computer system (STEP 302). However, event I may be a direct communication between user A to user B, such as by use of the Instant Message™ feature of the America Online computer service. User B may feel that event I is "objectionable" or "evil" (a subjective decision by B), and therefore generates a "vote" against the behavior of user A by sending a special type of response message—an "evil" event E (STEP 304). In the preferred embodiment, a user cannot "evil" another participant except in response to a message from the participant, or otherwise in cases where the participant's actions effect the user doing the "eviling." In order to reduce retaliation, users cannot "evil" other participants directly in response to being "eviled".

The online system receives event E and checks a database to see whether user B has the right to "evil" user A (STEP 306). For example, this step can limit users who themselves have been restricted from "eviling" other users.

In general, whenever one user (User B) attempts to "evil" another user (User A), two threshold questions arise: (1) is user B allowed to evil user A?; and (2) how much evil is User B allowed to exert on User A? The first question can be restated as the second question if the answer to the second question can be "zero" or "none at all." For this reason, the two questions are interrelated and the same criteria can be applied in answering both questions. Various alternative criteria that can be used are listed in bulletized form below.

If user B does not have the right to "evil" user A, then user B is notified of the affect of user B's action on user A's "evil index"—a value of how restricted user A is with respect to use of resources on the online system (STEP 308). In this case, user B's action has no affect on user A.

If user B does have the right to "evil" user A, then user A's "evil index" is modified by a suitable amount, which will affect further actions by user A (STEP 310), as described below. The amount of modification can be based on the past behavior of user A, or of users A and B. The amount of modification may also depend on the type of "eviling" asserted by user B. For example, user B may wish to assert an "eviling" event E anonymously rather than be identified. Anonymous "eviling" may be accorded lesser weight. That is, an anonymous "eviling" response may count as fewer evil "votes" than it would if the eviling user's identity was revealed. In one embodiment, an "eviling" user may set up an automatic "eviling" response to all communications from another specific user. In this case, the effect of the "eviling", which is intended to discourage communication from the specific user, is given very low weight (equivalently, counts as very few evil "votes") because of its automatic invocation.

User A's "evil index" is "broadcast" to other users who "know about" user A (STEP 312). For example, such users might be all of the participants in a private chat room, or all visitors to a public chat room. In one embodiment, a modified "evil index" is reported to each user in a current chat room's user list and to each user who has the "eviled" users on his or her "buddy list" (described in co-pending U.S. patent application Ser. No. 08/803,692, filed Feb. 24, 1997, entitled "User Definable On-line Co-user Lists", hereby incorporated by reference). Thus, an "eviled" user is publicly chastised.

Thereafter, user A's "evil index" begins to gradually "decay" back to normal over time (STEP 314). Such decay may be linear, exponential, step-wise, or some other function. Meanwhile, user B is notified of the affect of user B's action on user A's "evil index" (STEP 308). In this case, user B's action has had an effect on user A.

Some of the steps noted above may be done in different order without substantially changing the effect of the process. For example, STEPS 312, and 314, and 308 may be performed in different order.

A basic "penalty" for having a non-normal "evil index" is denial of access to a forum or the online service until the user's "evil index" has decayed back to normal. In a more refined embodiment, a user's "evil index" affects a rate limit which governs a user's ability to send (and/or receive) messages. This feature allows other participants to "evil" a user who "flames" or "spams" them, and thus reduce the rate at which the recalcitrant user can send and/or receive messages. A description of rate limiting is set forth below.

A server database (which may be centralized or distributed) stores a user's "evil index". A user's "evil index" can be maintained in a user-record as a global total, or by forum, or both. The value of each "evil index"can be used to control the user's ability to log on to the online computer system or access selected forums, and/or the effective rate of message or file transmissions.

Other criteria and/or rules may applied in different embodiments. For example, one or more of the following criteria and/or rules can be implemented:

A user must be in a forum (e.g., a chat room, but including direct communication between users, such as the Instant Message™ feature of the America Online computer service) for a specified amount of time before being allowed to "evil" another user in that forum; this reduces "hit-and-run flaming". The minimum amount of time may vary from forum to forum, and from user to user (e.g. a forum "sysop" may be immune to "eviling"). A user's user-record in the server database thus would record a time-of-entry for a forum. For example, a user's time-of-entry to a forum would be compared to the current time in STEP 306 of FIG. 3 to determine if the user had the right to "evil" another participant.

A user must be in a forum for a specified amount of time before being allowed to "evil" another user who has been in that forum for a longer period of time. For example, a user's time-of-entry to a forum would be compared to the time-of-entry of another participant in STEP 306 of FIG. 3 to determine if the user had the right to "evil" that other participant. The specified amount of time may vary from forum to forum, and from user to user.

A user's eviling response may be accorded increased weight (equivalently, counted as extra "evil"votes) based on the "seniority" of the "eviling" user. Each additional unit of time spent in a forum could enhance a user's "seniority," thereby allowing long term user's more "eviling" power than new-comers. That is, being "eviled" by an "old-timer" can have a greater than normal affect on modification of a chastised user's "evil index" in STEP 310 of FIG. 3. A user's user-record in the server database thus would record a total-time-of-access for each forum, which could be a "lifetime" total (such that users who had belonged to the online computer service for longer periods would have greater "eviling" power than relatively new subscribers to the service), a running total for a selected period of time, or a session total. The time period for accumulating extra votes and the "eviling" value of extra votes may vary from forum to forum, and from user to user.

A user may be limited in the number of "eviling" votes that can be cast in any one online session or time period (e.g., a day or week). A user's user-record in the server database thus would record the number of"eviling" votes cast globally or by forum. For example, a user's number of previous "eviling" votes cast could be examined in STEP 306 of FIG. 3 to determine if the user had the right to "evil" another participant.

A user's ability to "evil" another user may depend on the type of action in which the offending user engaged. Some actions (e.g., sending an Instant Message™) are more personal and/or disruptive than others, and therefore may precipitate a higher degree of eviling than less offensive actions.

A user's ability to "evil" another user may depend on the current "evil" level of the "eviled" user, the "eviling" user or both. A user's current "evil" level is a measure of how often this user has misbehaved in the recent past. In deciding whether and how much one user can "evil" another, the current evil levels could be compared to predetermined threshold values, to dynamically shifting values, or against each other (i.e., the relative difference in evil levels between the "eviled" and "eviling" users). "Permanent evil"—i.e., evil that does not decay over time—can be used to indicate a recidivist evil user (that is, a user that consistently misbehaves). The existence of "permanent evil" for the "eviled" user or the "eviling" user, or both, also could be used in deciding whether and how much one user can "evil" another.

A user's ability to "evil" another user may depend on the current rate limiting state (e.g., the rate at which a user can send messages) of the "eviled" user, the "eviling" user or both. A user's current rate limiting state is a measure of how close the user is to abusing the messaging rate that user currently is allowed. In deciding whether and how much one user can "evil" another, the current rate limiting states could be compared to predetermined threshold values, to dynamically shifting values, or against each other (i.e., the relative difference in rate limiting states between the "eviled" and "eviling" users). Similarly, a user's consumption of other system resources (e.g., memory usage, number of forums occupied) also could be used in deciding whether and how much one user can "evil" another.

Other various factors that could effect whether and how much one user can "evil" another user include the following: the amount of "evil" that the "eviled" and "eviling" users have exerted (e.g., per session, or per unit time, or total lifetime); whether an "eviled" or "eviling" user frequent rooms known to be used by hackers or known to be used for other illegal activities; the number of screen names possessed by the "eviled" or "eviling" user; the occurrence of multiple screen name logins (indicative of hacker activity); the existence of past complaints about the "eviled" or "eviling" user; the amount of revenue generated (e.g., by advertisements, e-commerce, or subscription fees) by the "eviled" or "eviling" user; the message patterns (e.g., the number of people with whom regular contact is maintained) of the "eviled" or "eviling" user or the extent of misbehavior by the people with whom regular contact is maintained.

The amount of modification of a user's "evil index" in STEP 310 of FIG. 3 after being "eviled" is preferably non-linear, so that the first few times a user is "eviled" has little effect (and possibly no effect until some threshold level of accumulated "eviling" votes from several participants are asserted against the user) on the user's "evil index" (everyone makes a few mistakes). However, for subsequent times that a user is "eviled", the user's "evil index" preferably is modified to a much greater degree, increasing the penalty for recidivism. The determination of how much to modify a user's "evil index" can be based on the user's global "evil index" (i.e., a "rap sheet" evaluation) or forum "evil index" (i.e., a "fresh start" approach). A user's user-record in the server database would thus record the number of times the user has been "eviled", either globally or by forum, for example. The recorded number might be a "lifetime" total or a running total for a selected period of time. The amount of "evil index" modification may also vary from forum to forum, and from user to user.

As an example, each user may be given an initial "evil index" of 100. A first "offense" may reduce that value to 95; a second "offense" reduces the value to 85; third and subsequent offenses reduce the current value by 15 units. Alternatively, each user is given an initial "evil index" of 0 and "eviling" increases that value. If a range of 100 is used, a user's "evil index" may be regarded as a "percentage of evil", up to 100% "evil".

The decay rate for returning a user's modified "evil index" to normal can vary from forum to forum. For example, the decay in chat rooms (where most flaming occurs) may be less than in other forums. Using the example from immediately above, the user's "evil index" may "decay" back to "normal" at the rate of 2 units per hour in a chat room, but at the rate of 5 units per hour in other forums.

A user may query a forum to determine the rate of "eviling" within the forum as a measure of how much members of the forum "evil" one another. A high rate may indicate that one or more members are misbehaving. The system keeps track of all users participating in a forum, so the current "eviling" rate is a time-weighted average of the number of "eviling" votes cast by the current participants. In an alternative embodiment, a user may query a forum to determine the accumulated value of the "evil index" of all current users. This measures how often the users have misbehaved in the past, and can serve as an estimate of the likelihood that the current users will misbehave in the future. The system keeps track of all users participating in a forum, so the total "evil index" is the sum of the pertinent forum "evil index" for each participant.

In some embodiments, a user who has been "eviled" has a lessened ability to "evil" other users (thus reducing retaliation). However, some online systems implement message types, such as broadcast or multi-cast messages or self-repeating messages, that are more frequently used than other message types to flame or spam other participants. In some embodiments, it may be desirable to allow all users (even those with a modified "evil index", and thus possibly restricted in usage rights) to "evil" the originator of such message types. Such a determination would be made in STEP 306 of FIG. 3 by examining the message type of event I sent by the originating user. The amount of modification of such an originator's "evil index" can be set to be greater than for flaming to discourage use of such message types for spamming.

When a user's "evil index" is modified, the user is notified that one or more usage parameters or privileges (e.g., permitted messaging rate, unit cost of computer-based service, access to specified forums, etc.) associated with that user have been modified accordingly. For example, an increase of a user's evil index could result in limiting that user's permitted messaging rate. In one embodiment, a message is sent from the server that contains the user's current "evil index" to the "eviled" user, and optionally includes the current rate of decay back to normal. Such information allows a wide range of feedback to be presented to the user about his or her ability to interact with the online computer system. For example, a graphical "power meter" or "power bar graph" can be used to indicate the "evil index" of the user. For instance, a color-coded bar graph can be divided into (1) a green zone to represent that the user's "evil index" is normal; (2) a yellow zone to represent that the user's "evil index" has been modified slightly; (3) a red zone to represent that the user's "evil index" has been modified significantly; and (4) a black zone to represent that access or message privileges have been suspended for a time. However, other methods of informing a recalcitrant user of his or her "evil index" can be used.

In one embodiment, a user can "rehabilitate" his or her "evil index" by visiting advertisements displayed on the online computer system; "visits" can be determined by requiring the user to "click" on an advertisement. The user is rewarded with more "power" by adjusting the value of the user's "evil index" more towards normal.

"Evil" Instrumentation

Because the rules governing evil can entail considerable complexity in certain implementations, teaching such rules to a relatively unsophisticated user can be difficult. Moreover, it is likely that the particular evil rules employed will change over time as the system is tuned according to the preferences of the system administrator. Therefore, one technique for conveying to users a measure of how the evil rules are affecting their actions on the system involves the use of instrumentation, for example, graphical abstractions such as displays of dials, gauges, read-outs or the like.

One goal of this instrumentation is to show a user how much evil he or she has the potential to express with respect to each person to whom he or she may express evil. The instrumentation also can show how much evil a user potentially is subject to from each person who has the potential to express evil against that user. The display of these values is updated periodically, typically whenever a potential evil level changes. This instrumentation allows users to see the effects of their actions without having to know the rules governing the effects. A user can use this information to modify his or her behavior, for example, in order to avoid further negative effects in the future. In addition, because the system provides immediate feedback, a user can intuit an approximation of the rules without having to learn the precise rules.

Figure 4:
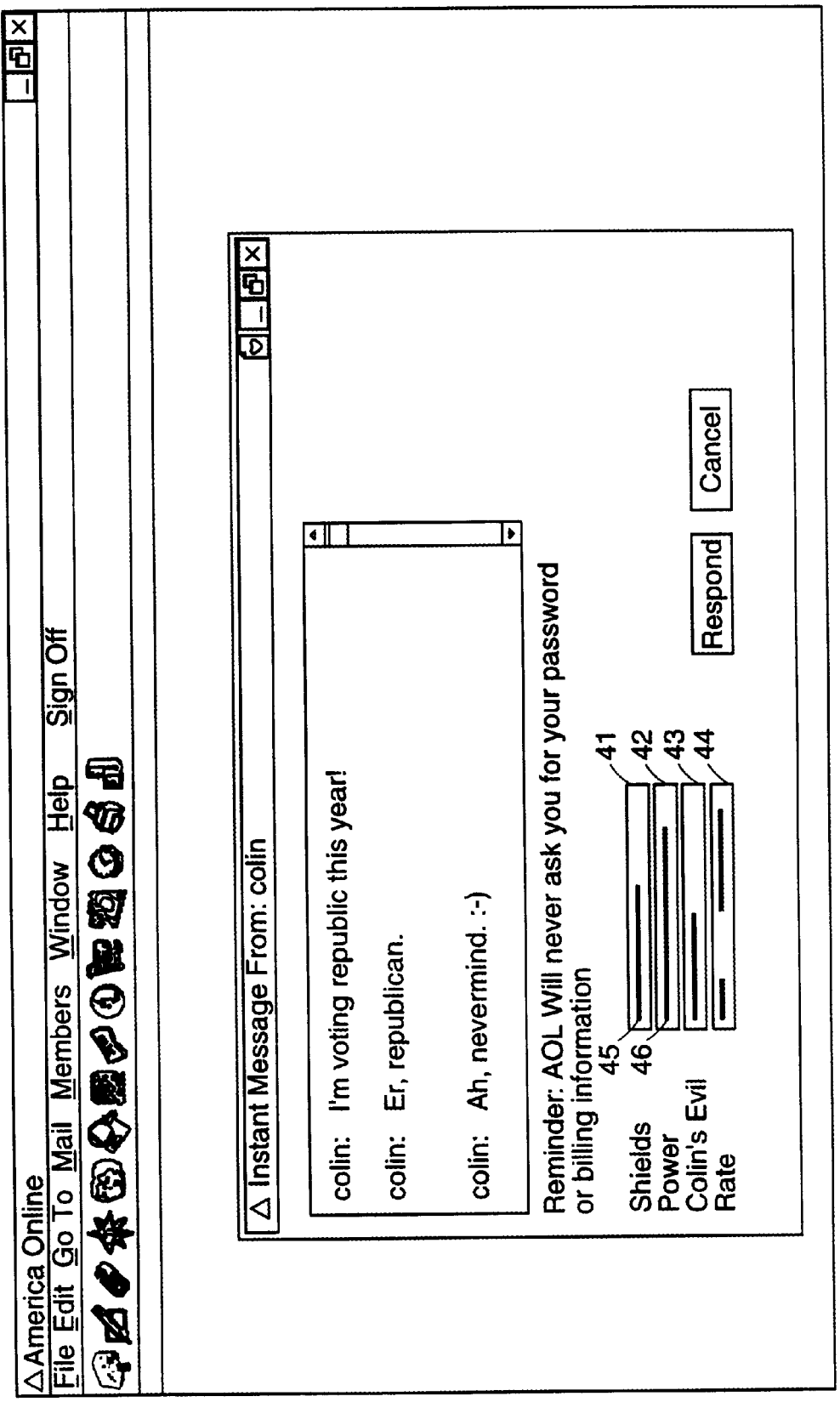
FIG. 4 is a screen shot showing an example of instrumentation that can be used to convey "evil" information.

The screen shot of window 40 shown in FIG. 4 illustrates an example of graphic instrumentation that can be used to convey "evil" information to a user—specifically, "power bars" 41, 42, 43 and 44 similar to the shields and phaser displays common in computer games. Power bar 41 displays the user's current "Evil Shields"—a measure of how much evil a user potentially is subject to from others—by shortening or lengthening the indicator 45 as appropriate. Power bar 42 displays the user's current "Evil Power"—a measure of amount of influence that the user can have over another's evil level—similarly by shortening or lengthening the indicator 46 as appropriate. Power bar 43 indicates the current evil level of another with whom the user presently is interacting. Power bar 44 indicates the user's current "rate"—an indication of the extent to which the user's evil level has limited that user's permissible messaging rate.

As an example of how the instrumentation can provide valuable feedback to a user, assume that the rules specify that whenever user A sends user B an Instant Message, user A becomes subject to evil from user B, should user B be offended by the Instant Message. Upon sending the Instant Message, the system (typically on the server side, but potentially also, or alternatively, on the client side) calculates a new potential level of evil that B may express towards A, and then informs both A and B of this newly calculated value via the instrumentation. When user A sends user B an Instant Message, A's Evil Shields bar could show user A's shields going down, indicating that A is more exposed to evil by user B. Similarly B's Evil Power bar could show user B's Evil Power going up with respect to user A, indicating that B has more potential evil "power" which may be expressed against A. Using the power bar mechanism, the system displays to users the consequences of their actions, and the measures that they can employ against users who they find objectionable. In this manner, users would gain over time an appreciation for the evil rules and modify their behavior accordingly.

Capping "Evilability" Accumulation

During the course of a conversation in a forum, a user A may send many messages to a user B. In one embodiment, the amount of "evilability" (the amount of evil that one user can express against another) that can be accumulated is uncapped—e.g., each message sent by user A to user B increases, without any upper limit, the amount of evil that B subsequently may express against A. As a result, if after a lengthy conversation B decides to apply all of that evil to A, A might suddenly go from a state of having little or no evil to one of high evil, perhaps resulting in A's disconnection from the service. Such a situation could be prone to abuse if, for example, user B has lured user A into conversation, and has prolonged that conversation, for the purpose of being able to exert an undue amount of evil against user A at the termination of the conversation.

Depending on the particular preferences of the system administrator, such an uncapped build-up of evil may not reflect the way in which the system is intended to be used. One technique for minimizing such abuse is to place a cap or limitation—e.g., either temporal or quantitative—on the amount of evilability that can be accumulated. An example of a temporal limitation on evilability accumulation would be to require that an offensive Instant Messages be eviled only within a predetermined time period following its receipt. After that time period, any incremental evilability that may have been accumulated as a result of receiving that Instant Message is removed. This helps to ensure that the sender of the offensive Instant Message will receive immediate feedback that his or her actions were unwelcome, thereby allowing that user to curb his or her actions. At the same time, the temporal cap can serve effectively as a "statute of limitations" ensuring that users will not be unfairly prejudiced by receiving punishment for actions that were undertaken in the relatively distant past.

Alternatively, or in addition, the accumulation of evilability can be capped in a quantitative sense—i.e., imposing a limit on the quantity of evilability that can be accumulated. A quantitative evilability cap has an advantage, in one sense, in that its effectiveness does not depend on the continuous activity and vigilance of the users under consideration. In contrast, if only a pure temporal limitation on evilability accumulation is used, a user effectively could escape the effect of the limitation by determining that another user is idle—for example, temporarily away from his or her computer—and then sending obscene or otherwise objectionable messages to that user during his or her absence. When the absent user returns eventually, and is exposed to the objectionable messages, no recourse will be available because the incremental evilability associated with the objectionable message has since lapsed.

A quantitative evilability cap could be implemented as a simple ceiling on the amount of evilability that can be accumulated or it could be implemented using a more sophisticated formula for calculating the potential evilability generated by an event (such as sending an Instant Message). Such a formula could be modified to take into account the amount of potential evilability already available for use by the event's recipient against the event's sender. In one embodiment, the amount of potential evil generated by the event is calculated, and then truncated as necessary to prevent the total amount of potential evilability from exceeding a cap value. The cap value is chosen to be high enough such that the build-up of potential evilability acts as a significant deterrent, but low enough that the evil user is not automatically disconnected from the system. Once evilability is expressed, the reservoir of potential evilability is diminished, bringing it below the cap. As a result, further events sent by the evil user will add potential evilability to the reservoir, (since its value is below the cap at this point), until the reservoir again reaches its cap value. Thus, a recipient who applies his or her potential evil in a continuing and periodic manner, rather than allowing it to build up, never would be subject to the cap.

Interpersonal Context

As an additional or alternative refinement, the evilability formula could take into account the "interpersonal context" between users. For example, the evilability formula could be modified to recognize that the ordering of messages reflects the likelihood of their being objectionable. One possible assumption could be that the first message in a conversation between two users is more likely to be objectionable than subsequent messages. Under that assumption, each subsequent message builds-up a conversational and interpersonal context between the parties involved and reduces the likelihood of misbehavior by the participants. If one of the participants regarded the conversation or the other party(s) as objectionable, one could logically assume that the offended participant would discontinue the conversation (via verbal warnings, evil, blocking, or disconnecting). Hence, in longer conversations each message generally tends to be less objectionable. Furthermore, upon receipt of an initial event (e.g., Instant Message) from user A, user B may need several responses in order to ascertain the identity and intentions of user A. These initial responses preferably should not subject B to evil attacks from A. In other words, A should not be able to lure B into a trap by soliciting events from B, then eviling those events. In order to reflect these concepts, the function defining the potential evilability generated by an event can be modified to take into account the ordering of the events within the conversational and interpersonal context.

In one embodiment, initial evilability penalties are imposed for each "conversation" initiated. A conversation is defined by the message-sender's session—i.e., every time a user logs off the system and then logs back on, that user is subject to an initial (e.g., in response to the sending of a first message) evil penalty with each user with whom they initiate an exchange. For example, the first Instant Message from a user in a conversation can be subject to double evilability, and the first N (e.g., 3 or 4) responses from the recipient are subject to half evilability. These initial values are subject to change based on empirical observations in order to fine tune the system. Moreover, alternate implementations can refine the definition of a conversation, and maintain inter-user contexts between sessions. For example, if the system maintained a database of who communicated (e.g., sent/received messages) with whom, when the communications occurred, and how many separate communications were dispatched, received and/or responded to, then a more robust definition of "conversation" could be implemented.

Automatic Rate Limiting

In one embodiment, the particular parameter or privilege that is modified according to the rise or fall of the user's evil index is the user's permitted messaging rates. In this embodiment, both input and output messaging rates of a user are limited based on the behavior of the user and/or available system resources. Such rate limiting can stop malicious users and errant client computers from consuming more than a fair share of online system resources. However, preferably the rate limiting system is weighted to tolerate brief bursts of messaging activity while penalizing unacceptably large rates of messaging. Rate limiting can also limit aggregate input to a server to a level at which the system is reasonably loaded under normal conditions. Rate limiting can also be combined with "eviling" by automatically adjusting a users rate limit parameters based on their "evil index."

In one embodiment, input rate limiting - from user to server - is conducted on a per user connection basis, and within a user connection on a per-message type bases (that is, rate limits for different types of messages may be set to different values). In one embodiment, rate limiting for a user is achieved in accordance with the following algorithm:

1) Define A as the running average of inter-message time gaps for the last N messages of selected types that the user has attempted to send; a system selected value I is used as the first value for A. Calculation of A can be done, for example, on a forum basis (accounting only for messages sent in the current forum), session basis (accounting for messages sent in the user's current online session), or message-count basis (accounting for the last N messages sent at any time in any forum).
2) If A is below a warning threshold W (indicating that the user is approaching a point of sending messages too frequently), when the user attempts to send a message, send the user a warning message but transmit the user's message.
3) If A is below a rate limit threshold R (indicating that the user is sending messages too frequently) when the user attempts to send a message, send the user a warning message and drop the user's message.
4) Repeat the above steps until A rises above a clear threshold C (indicating that the user is not sending messages too frequently), at which time the rate limiting condition is considered cleared.
5) If at any time A drops below a disconnect threshold D, disconnect the user.

Figure 5:
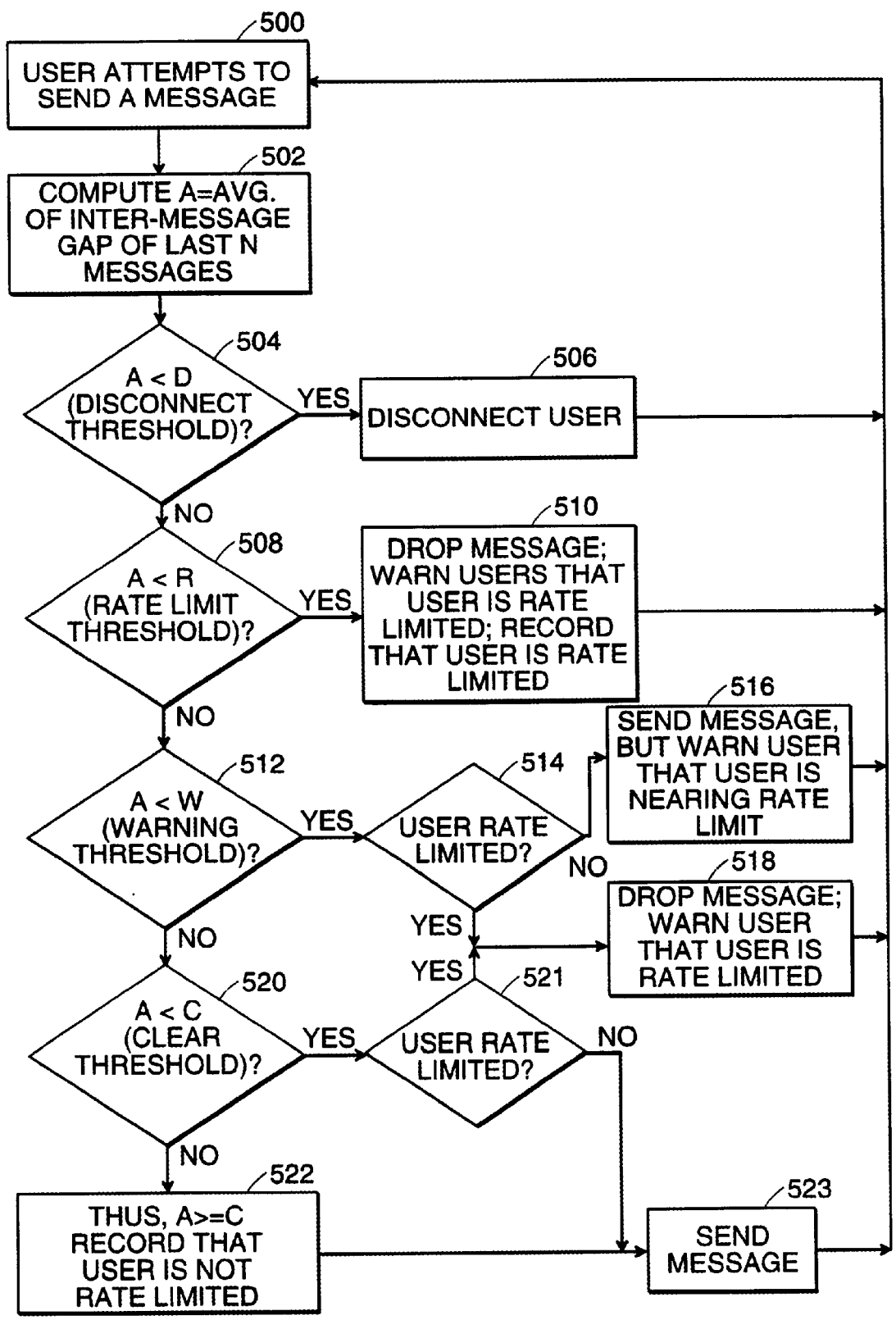
FIG. 5 is a flowchart of a basic embodiment of the rate-limiting aspect of the invention.
Figure 4:
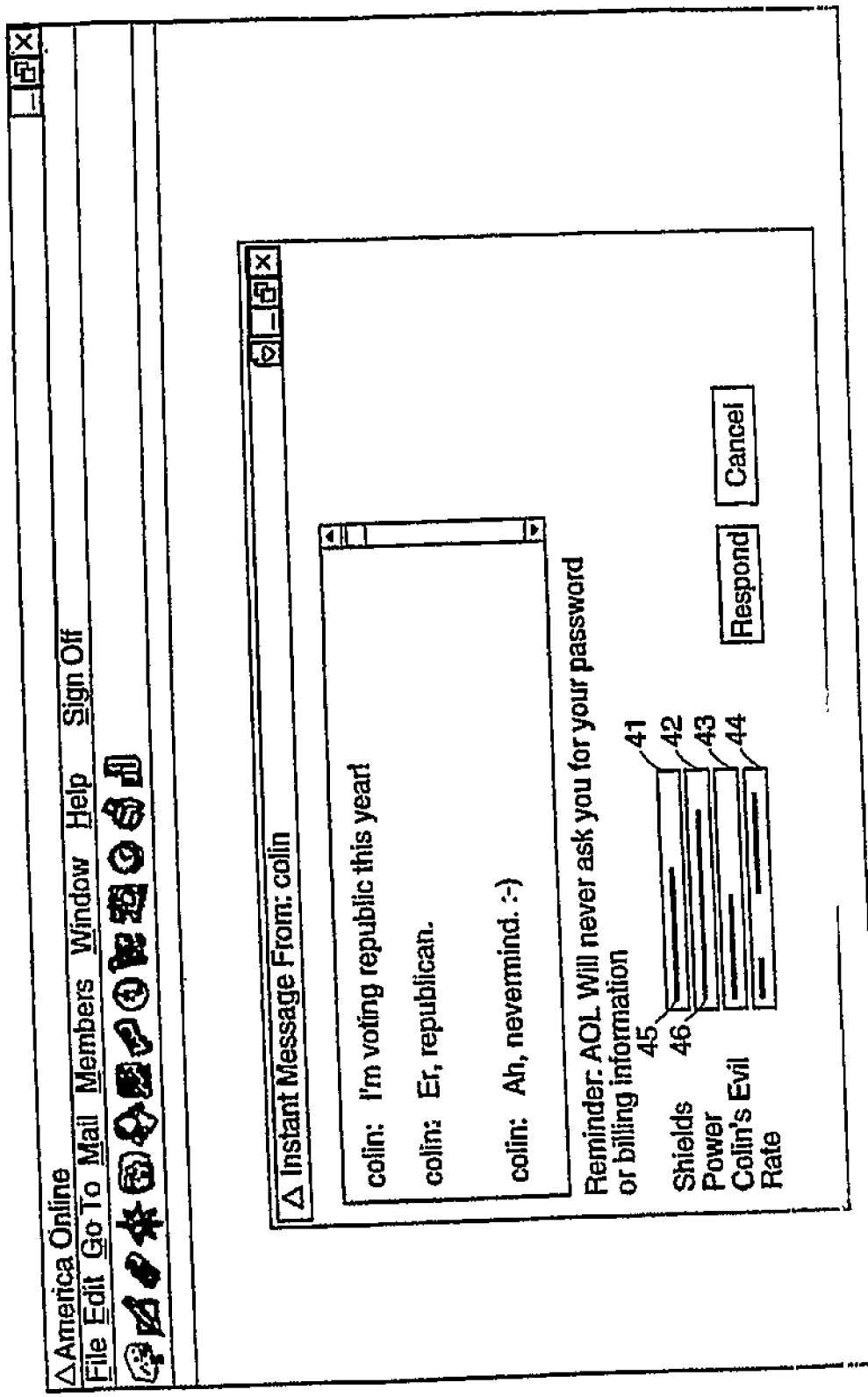

FIG. 5 is a flowchart of a basic embodiment of the rate-limiting aspect of the invention, showing a slightly different order for the steps described above. A user attempts to send a message (STEP 500). Average A is computed (Step 502). If A is less than a disconnect threshold D (Step 504), the user is disconnected (Step 506). Otherwise, if A is less than a rate limit threshold R (Step 508), the message is dropped, the user is warned that the rate limited has been exceeded, and the user is flagged as "rate limited" (Step 510).

Otherwise, if A is less than a warning threshold W(Step 512), a determination is made as to whether the user is rate limited (Step 514). If not, the message is sent, but the user is warned that the rate limit is being approached (Step 516). Otherwise, the message is dropped and the user is warned that the rate limited has been exceeded (Step 518).

If A is not less than the warning threshold W (Step 512), and A is less than a clear threshold C (Step 520), a determination is made as to whether the user is rate limited (Step 521). If not, the message is sent (Step 523). Otherwise, the message is dropped and the user is warned that the rate limited has been exceeded (Step 518).

Finally, if A is not less than the clear threshold C (Step 520), the rate limit flag for the user is cleared (Step 522) and the message is sent (Step 523).

The rate limiting algorithm supports several "tunable" parameters:

The running average of inter-message time gaps—A

The number of message receptions over which A is calculated—N

An initial average—I

A clear threshold—C

A warning threshold—W

A rate limit threshold—R

A disconnect threshold—D

In one embodiment, the values for C, W, R, and D are selected such that C>W>R>D. The initial average rate I can be weighted to increase the algorithm's tolerance of bursts of activity, such as "chatty startups" when a user joins a forum and sends several messages in succession. The threshold rates can be set globally for all user's, or "tuned" for each user.

In one embodiment, the difference between the clear threshold C and the rate limit threshold R can be "tuned" by the online computer system to alter the interval between commencement of rate limiting for a user and the resumption of normal activity. The difference between C and R may be automatically increased, for example, if the user sends excessive "spamming" type messages at too great a rate. Further, the threshold values C, W, R, and D can be dynamically modified by the online system as a way of limiting system resource usage if too many users are simultaneously using the system.

As noted above, when a user's message rate is limited, the user is notified. In one embodiment, a message is sent from the server to a rate limited user that contains values for each of the parameters outlined above, and another message is sent the next time that the server will accept messages from the user without restriction. Such information allows a wide range of feedback to be presented to the user about his or her ability to interact with the online computer system. For example, a graphical "power meter" or "power bar graph" can be used to indicate the "health" or "power" of the user. For instance, a color-coded bar graph can be divided into (1) a green zone to represent that no rate limiting is in effect; (2) a yellow zone to represent that the user's message rate is near the point where rate limiting would take effect; (3) a red zone to represent that message rate limiting is in effect; and (4) a black zone to represent that access privileges have been suspended for a time. However, other methods can be used to inform a recalcitrant user of his or her message rate limit status.

In one embodiment, a user can "rehabilitate" his or her message rate limit status by visiting advertisements displayed on the online computer system. The user is rewarded with more "power" by adjusting the parameters.

In one embodiment, output rate limiting - from server to user - is performed in a similar manner, with the following differences:

1) The system server audits the rate of outgoing error messages of selected types (e.g., RATE_TO_HOST), and uses the above rate limiting algorithm with R=D, to prevent excessive load due to handling users that are generating rate errors.

2) The system server can limit the rate of outgoing messages of selected types (e.g., those types that may be used for spamming) using the above rate limiting algorithm when A<R. In this case, a notice message can be sent to the user, to the user's intended recipient, and to a server storing the user's "evil index". The intended recipient can "evil" the sending user, or the system server can automatically modify the user's "evil index" based on the sending of excessive "spamming" type messages at too great a rate.

The algorithms described above prevent abuse of online system resources without causing undue "pain" to users, including "power users" and users who are subject to delays and input/output timing changes by non-ideal networks (which can cause otherwise normal user activity to appear to be unacceptable activity).

Rate Limiting and "Eviling"

The concepts of automatic rate limiting and modification of a user's "evil index" can be combined to provide a refined self-policing, automatic rate limiting system that can regulate an "eviled"user's ability to participate in forums without requiring total exclusion from the forum. Further, a user's current global or forum "evil index" can be used to modify the parameters used to effect automatic (i.e., "non-eviled" basis) rate limiting for the user. For example, a user's ability to interact in a forum can be rate limited by modifying the values for A, C, W, R, and/or D as a function of whether the user's "evil index" has been modified, or as a function of the current value of the user's "evil index". Conversely, the amount of modification of a user's "evil index" can be a function of the current value of A. Thus, conceptually, a user's permitted message rate $R_p$ is a function of the user's "evil index" EI plus the user's rate of attempted message activity A: $R_p = f(EI) + g(A)$ Conceptually, each user's user-record thus may look like the following table:

| Forum ID | "evil index" | decay rate | # times "eviled" | # times "eviled" others | time-of-entry | total-time of-access | A | C | W | R | D |
|---|---|---|---|---|---|---|---|---|---|---|---|
| Global value | | | | | | | | | | | |
| Forum 1 value | | | | | | | | | | | |
| Forum 2 value | | | | | | | | | | | |
| etc. | | | | | | | | | | | |

Separate "lifetime" and "session" records may be kept where useful. Of course, other or different information may be recorded for each user, and other ways of organizing such data may be used. Further, users may be assigned a "class" designation (such as "sysop" (system operator), corporate users, paying members, non-paying members, etc.) which can be given weight in making a determination of right to "evil" or absolute or relative immunity from being "eviled" in STEP 306 of FIG. 3.

In setting rate parameter values for a user, a global rate table can be used which is indexed by a user's "evil index";

that is, message rate parameters are a function of the user's global or forum "evil index". A conceptual example of one such table might be the following (ΔA represents an optional adjustment to be applied to the calculated value of A):

| "evil index" value | ΔA | C | W | R | D |
|---|---|---|---|---|---|
| 0–20 | | | | | |
| 21–40 | | | | | |
| 41–60 | | | | | |
| 61–80 | | | | | |
| 81–90 | | | | | |
| 91–95 | | | | | |
| 96–100 | | | | | |

The values for A, C, W, R, and D in this table can be defined globally or by forum. If by forum, the values can be defined in absolute terms or as relative offsets to a global table. Multiple tables of this form also can be defined, indexed by message type, so that misuse of certain types of messages are punished more than misuse of other message types.

Alternatively, a non-tabular implementation could be used instead of the global rate table described above. For example, a user's rate parameter values (ΔA, C, W, R, D) could be defined as a function describing a relation between these quantities.

Short Term Rate Limiting

As noted above, a fundamental connection can be made to exist between a user's evil level and the degree of rate limiting applied to that user. That is, the evil level can be used in determining the rate limiting parameters, which are then applied to the maximum allowable message rate of a client, preventing the client from sending data faster than the rate limiting formula allows. Higher levels of evil typically will result in more restrictive rate limiting. In this way, evil users—i.e., those who have behaved objectionably in the eyes of their peers—are restricted in their use of the system.

However, empirical observation suggests that users who are new to the system are not easily educated about the relationship between evil and rate limiting. Further, users with low levels of evil may never actually enter into the rate limiting state. In other words, some users use of the system may be light enough that their message rate does not exceed the limit set by the rate limiting function. As a result, such users might not experience the detrimental effects of rate limiting even though they have engaged in objectionable activities and have non-trivial levels of evil.

In order to educate users about the detrimental effects of rate limiting, and build in them an appreciation for the relationship between rate limiting and evil, the system can apply short term rate limiting upon the user's initial transition from having no evil to having some level of evil. When a user starts with no evil, but then becomes evil due to some objectionable conduct, that user is put into a rate limiting state (for example, as discussed above with regard to step 510 in FIG. 5). By properly setting the rate limiting parameters, this temporary rate limiting state can be limited to a short time, for example, just long enough to give the offending user a short taste of rate limiting. In practice, this state typically will last for just a few seconds. During that time, the offending user will be unable to send messages, and any messages that the user tries to send will further drive his or her rate average toward the disconnect level. Once the user has allowed the rate limits to reach a clear state (e.g, after just a few seconds delay assuming the user does not persist in trying to send messages) the rate limit will return to the normal for the user's current evil level.

Implementation

The methods and mechanisms described here are not limited to any particular hardware or software configuration, but rather they may find applicability in any computing or processing environment used in connection with online computer services.

The invention may be implemented in hardware or software, or a combination of both. However, preferably, the invention is implemented in computer programs executing on programmable computers each comprising at least one processor, at least one data storage system (including volatile and non-volatile memory and/or storage elements), at least one input device, and at least one output device. Program code is applied to input data to perform the functions described herein and generate output information. The output information is applied to one or more output devices, in known fashion.

Each program is preferably implemented in a high level procedural or object oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

A number of embodiments of the present invention have been described. Nevertheless, it will be understood that various modifications may be made without departing from the spirit and scope of the invention. Accordingly, other embodiments are within the scope of the following claims.

What is claimed is:

1. A method, performed on a computer system, of regulating an active user of a computer-based service, the method comprising:

(a) receiving input at the computer system about a first active user from at least one other active user of the computer-based service;

(b) determining at the computer system, and without human intervention, a degree to which the at least one other active user can influence a parameter associated with the first active user;

(c) modifying at the computer system, and without human intervention, the first active user's parameter based on the received input and the determined degree of influence.

2. The method of claim 1, in which the first active user's parameter remains unaffected when the degree of influence is determined to be zero.

3. The method of claim 1, in which the determination of the degree of influence comprises considering a type of action engaged in by the first active user that caused the at least one other active user to provide input.

4. The method of claim 3, further comprising determining that the at least one other active user can have a high degree of influence on the first active user's parameter when the type of action engaged in by the first active user that caused the at least one other active user to provide input was personally directed at the other active user.

5. The method of claim 3, further comprising determining that the at least one other active user can have a high degree of influence on the first active user's parameter when the type of action engaged in by the first active user that caused the at least one other active user to provide input was an Instant Message.

6. The method of claim 1, in which the determination of the degree of influence comprises considering a behavioral index level of the first active user or the at least one other active user or both.

7. The method of claim 6, in which the consideration comprises comparing an active user's behavioral index level to a predetermined threshold.

8. The method of claim 6, in which the consideration comprises comparing an active user's behavioral index level to a dynamically shifting threshold.

9. The method of claim 6, in which the consideration comprises comparing the first active users behavioral index level to the at least one other active user's behavioral index level.

10. The method of claim 1, in which the determination of the degree of influence comprises considering a rate limiting state of the first active user or the at least one other active user or both.

11. The method of claim 10, in which the consideration comprises comparing an active user's rate limiting state to a predetermined threshold.

12. The method of claim 10, in which the consideration comprises comparing an active user's rate limiting state to a dynamically shifting threshold.

13. The method of claim 10, in which the consideration comprises comparing the first active user's rate limiting state to the at least one other active users rate limiting state.

14. The method of claim 1, in which the determination of the degree of influence comprises considering a resource usage level of the first active user or the at least one other active user or both.

15. The method of claim 14, in which the consideration comprises comparing an active user's resource usage level to a predetermined threshold.

16. The method of claim 14, in which the consideration comprises comparing an active user's resource usage level to a dynamically shifting threshold.

17. The method of claim 14, in which the consideration comprises comparing the first active user's resource usage level to the at least one other active user's resource usage level.

18. The method of claim 14, in which memory usage by an active user affects that active user's resource usage level.

19. The method of claim 14, in which a number of forums occupied by an active user affects that active user's resource usage level.

20. The method of claim 1, in which the determination of the degree of influence comprises considering an amount of previous input about other active users submitted by the first active user or the at least one other active user or both.

21. The method of claim 20, in which the amount of previous input about other active users is measured per session, per unit time, or per lifetime.

22. The method of claim 1, in which the determination of the degree of influence comprises considering whether the first active user, the at least one other active user, or both, frequent forums associated with illegal activity.

23. The method of claim 1, in which the determination of the degree of influence comprises considering previous complaints against the first active user or the at least one other active user or both.

24. The method of claim 1, in which the determination of the degree of influence comprises considering previous complaints against the first active user or the at least one other active user or both.

25. The method of claim 1, in which the determination of the degree of influence comprises considering an amount of revenue generated by the first active user or the at least one other active user or both.

26. The method of claim 25, in which an active user's generated revenue comprises subscription revenue, advertising revenue, or e-commerce revenue.

27. The method of claim 1, in which the determination of the degree of influence comprises considering messaging patterns of the first active user or of the at least one other active user or both.

28. The method of claim 27, in which an active user's messaging pattern includes a number of other active users with whom regular contact is maintained.

29. The method of claim 27, in which an active user's messaging pattern includes an indication of misbehavior by other active users with whom regular contact is maintained.

30. The method of claim 1, in which modifying a parameter associated with the first active user comprises limiting the first active user's permissible messaging rates.

31. The method of claim 1, in which modifying a parameter associated with the first active user comprises limiting the first active user's access to one or more forums.

32. The method of claim 1, in which modifying a parameter associated with the first active user comprises modifying the first active user's cost of using the computer-based service.

33. The method of claim 1, in which modifying a parameter associated with the first active user comprises varying a degree of influence that the first active user has over another active user of the computer-based service.

34. The method of claim 1, further comprising:
  (d) displaying information related to a current state of the first active user's modified parameter.

35. The method of claim 1, in which determining the degree of influence comprises considering an interpersonal context between the first active user and the at least one other active user.

36. The method of claim 34, in which considering the interpersonal context comprises applying a function based on an ordering of events during an interaction of the first active user and the at least one other active user.

37. The method of claim 1, in which modifying a parameter associated with the first active user comprises temporarily limiting the first active user's ability to use the computer-based service if the input received from the at least one other active user constitutes a first occurrence of input about the first active user.

38. The method of claim 37, in which the temporary limitation on the first active user's ability to use the computer-based service comprises a short-term limitation.

39. A computer program, residing on a computer-readable medium, for regulating an active user of a computer-based service, comprising instructions for causing a computer to perform the following operations:
  (a) receive input about a first active user from at least one other active user of the computer-based service;

(b) determine a degree to which the at least one other active user can influence a parameter associated with the first active user;

(c) modify the first active user's parameter based on the received input and the determined degree of influence.

40. The method of claim 37, in which the capping of the degree of influence comprises applying a function based on an elapsed time since an occurrence of an action engaged in by the first active user that caused the at least one other active user to provide input.

41. The computer program of claim 37, in which the instructions to determine the degree of influence comprise instructions to consider a type of action engaged in by the first active user that caused the at least one other active user to provide input.

42. The computer program of claim 37, in which the instructions determine that the at least one other active user can have a high degree of influence on the first active user's parameter when the type of action engaged in by the first active user that caused the at least one other active user to provide input was personally directed at the other active user.

43. The method of claim 1, in which determining the degree of influence comprises considering an interpersonal context between the first active user and the at least one other active user.

44. The method of claim 43, in which considering the interpersonal context comprises applying a function based on an ordering of events during an interaction of the first active user and the at least one other active user.

45. The method of claim 1, in which modifying a parameter associated with the first active user comprises temporarily limiting the first active user's ability to use the computer-based service if the input received from the at least one other active user constitutes a first occurrence of input about the first active user.

46. The method of claim 45, in which the temporary limitation on the first active user's ability to use the computer-based service comprises a short-term limitation.

47. A computer program, residing on a computer-readable medium, for regulating an active user of a computer-based service, comprising instructions for causing a computer to perform the following operations:

(a) receive input about a first active user from at least one other active user of the computer-based service;

(b) determine a degree to which the at least one other active user can influence a parameter associated with the first active user;

(c) modify the first active user's parameter based on the received input and the, determined degree of influence.

48. The computer program of claim 47, in which the first active user's parameter remains unaffected when the degree of influence is determined to be zero.

49. The computer program of claim 47, in which the instructions to determine the degree of influence comprise instructions to consider a type of action engaged in by the first active user that caused the at least one other active user to provide input.

50. The computer program of claim 49, in which the instructions determine that the at least one other active user can have a high degree of influence on the first active user's parameter when the type of action engaged in by the first active user that caused the at least one other active user to provide input was personally directed at the other active user.

51. The computer program of claim 49, in which the instructions determine that the at least one other active user can have a high degree of influence on the first active user's parameter when the type of action engaged in by the first active user that caused the at least one other active user to provide input was an Instant Message.

52. The computer program of claim 47, in which the instructions to determine the degree of influence comprise instructions for considering a behavioral index level of the first active user or the at least one other active user or both.

53. The computer program of claim 52, in which the instructions for considering a behavioral index level comprise instructions for comparing an active user's behavioral index level to a predetermined threshold.

54. The computer program of claim 52, in which the instructions for considering comprise instructions for comparing an active user's behavioral index level to a dynamically shifting threshold.

55. The computer program of claim 52, in which the instructions for considering comprise instructions for comparing the first active user's behavioral index level to the at least one other active user's behavioral index level.

56. The computer program of claim 47, in which the instructions to determine the degree of influence comprise instructions for considering a rate limiting state of the first active user or the at least one other active user or both.

57. The computer program of claim 56, in which the instructions for considering comprise instructions for comparing an active user's rate limiting state to a predetermined threshold.

58. The computer program of claim 56, in which the instructions for considering comprise instructions for comparing an active user's rate limiting state to a dynamically shifting threshold.

59. The computer program of claim 56, in which the instructions for considering comprise instructions for comparing the first active user's rate limiting state to the at least one other active user's rate limiting state.

60. The computer program of claim 47, in which the instructions to determine the degree of influence comprise instructions for considering a resource usage level of the first active user or the at least one other active user or both.

61. The computer program of claim 60, in which the instructions for considering comprise instructions for comparing an active user's resource usage level to a predetermined threshold.

62. The computer program of claim 60, in which the instructions for considering comprise instructions for comparing an active user's resource usage level to a dynamically shifting threshold.

63. The computer program of claim 60, in which the instructions for consideration comprise instructions for comparing the first active user's resource usage level to the at least one other active user's resource usage level.

64. The computer program of claim 60, in which memory usage by an active user affects that active user's resource usage level.

65. The computer program of claim 60, in which a number of forums occupied by an active user affects that active user's resource usage level.

66. The computer program of claim 47, in which the instructions to determine the degree of influence comprise instructions for considering an amount of previous input about other active users submitted by the first active user or the at least one other active user or both.

67. The computer program of claim 66, in which the amount of previous input about other active users is measured per session, per unit time, or per lifetime.

68. The computer program of claim 47, in which the instructions to determine the degree of influence comprise instructions for considering whether the first active user, the at least one other active user, or both, frequent forums associated with illegal activity.

69. The computer program of claim 47, in which the instructions for modifying a parameter associated with the first active user comprise instructions for modifying the first active user's cost of using the computer-based service.

70. The computer program of claim 47, in which the instructions to determine the degree of influence comprise instructions for considering previous complaints against the first active user or the at least one other active user or both.

71. The computer program of claim 47, in which the instructions to determine the degree of influence comprise instructions for considering an amount of revenue generated by the first active user or the at least one other active user or both.

72. The computer program of claim 71, in which an active user's generated revenue comprises subscription revenue, advertising revenue, or e-commerce revenue.

73. The computer program of claim 47, in which the instructions to determine the degree of influence comprise instructions for considering messaging patterns of the first active user or the at least one other active user or both.

74. The computer program of claim 73, in which an active user's messaging pattern includes a number of other active users with whom regular contact is maintained.

75. The computer program of claim 73, in which an active user's messaging pattern includes an indication of misbehavior by other active users with whom regular contact is maintained.

76. The computer program of claim 47, in which the instructions for modifying a parameter associated with the first active user comprise instructions for limiting the first active user's permissible messaging rates.

77. The computer program of claim 47, in which the instructions for modifying a parameter associated with the first active user comprise instructions for limiting the first active user's access to one or more forums.

78. The computer program of claim 47, in which the instructions for modifying a parameter associated with the first active user comprise instructions for modifying the first active user's cost of using the computer-based service.

79. The computer program of claim 47, in which the instructions for modifying a parameter associated with the first active user comprise instructions for modifying a degree of influence that the first active user has over another active user of the computer-based service.

80. The computer program of claim 47, further comprising instructions to:
  (d) display information related to a current state of the first active user's modified parameter.

81. The computer program of claim 80, in which the instructions for displaying information comprise instructions for updating a state of a graphical abstraction.

82. The computer program of claim 81, in which the graphical abstraction comprises a power bar.

83. The computer program of claim 47, in which the instructions for determining the degree of influence comprise instructions for capping the degree of influence to a maximum amount.

84. The computer program of claim 83, in which the instructions for capping the degree of influence comprise instructions for applying a ceiling function.

85. The computer program of claim 83, in which the instructions for capping the degree of influence comprise instructions for applying a time-out function.

86. The computer program of claim 83, in which the instructions for capping the degree of influence comprise instructions for applying a function based on an elapsed time since an occurrence of an action engaged in by the first active user that caused the at least one other active user to provide input.

87. The computer program of claim 83, in which the instructions for capping the degree of influence comprise instructions for applying a temporally based function.

88. The computer program of claim 83, in which the instructions for capping the degree of influence comprise instructions for applying a quantitatively based function.

89. The computer program of claim 47, in which the instructions for determining the degree of influence comprise instructions for considering an interpersonal context between the first active user and the at least one other active user.

90. The computer program of claim 89, in which the instructions for considering the interpersonal context comprise instructions for applying a function based on an ordering of events during an interaction of the first active user and the at least one other active user.

91. The computer program of claim 47, in which the instructions for modifying a parameter associated with the first active user comprise instructions for temporarily limiting the first active user's ability to use the computer-based service if the input received from the at least one other active user constitutes a first occurrence of input about the first active user.

92. The computer program of claim 91, in which the temporary limitation on the first active user's ability to use the computer-based service comprises a short-term limitation.

\* \* \* \* \*

UNITED STATES PATENT AND TRADEMARK OFFICE
CERTIFICATE OF CORRECTION

PATENT NO.       : 6,336,133 B1
APPLICATION NO.  : 09/076483
DATED            : January 1, 2002
INVENTOR(S)      : Eric Bosco et al.

It is certified that error appears in the above-identified patent and that said Letters Patent is hereby corrected as shown below:

Please replace Figure 4 with the attached Figure 4 replacement sheet.

Column 17 (Claim 9), line 24, change "users" to --user's--.

Delete claim 23 and replace with the following:

--23. The method of claim 22, in which the illegal activity comprises hacker activity.--

Delete claims 35-39 and replace with the following:

--35. The method of claim 34, in which displaying information comprises updating a state of a graphical abstraction.

36. The method of claim 35, in which the graphical abstraction comprises a power bar.

37. The method of claim 1, in which the determination of the degree of influence comprises capping the degree of influence to a maximum amount.

38. The method of claim 37, in which the capping of the degree of influence comprises applying a ceiling function.

39. The method of claim 37, in which the capping of the degree of influence comprises applying a time-out function.--

Delete claims 41 and 42 and replace with the following:

--41. The method of claim 37, in which the capping of the degree of influence comprises applying a temporally based function.

42. The method of claim 37, in which the capping of the degree of influence comprises applying a quantitatively based function.--

Column 19 (Claim 47), line 50, delete --,--.

UNITED STATES PATENT AND TRADEMARK OFFICE
CERTIFICATE OF CORRECTION

| | |
|---|---|
| PATENT NO. | : 6,336,133 B1 |
| APPLICATION NO. | : 09/076483 |
| DATED | : January 1, 2002 |
| INVENTOR(S) | : Eric Bosco et al. |

It is certified that error appears in the above-identified patent and that said Letters Patent is hereby corrected as shown below:

Delete claim 69 and replace with the following:

--69. The computer program of claim 47, in which the illegal activity comprises hacker activity.--

Signed and Sealed this

Nineteenth Day of December, 2006

JON W. DUDAS
*Director of the United States Patent and Trademark Office*